Patented June 12, 1934

1,962,287

UNITED STATES PATENT OFFICE 1,962,287

PROCESS OF CONDITIONING FRUIT FOR PACKING AND SEALING IN CONTAINERS

Arthur E. Stevenson, Chicago, Ill., assignor to Continental Can Company, Inc., New York, N. Y., a corporation of New York No Drawing. Application June 9, 1933, Serial No. 675,143

2 Claims. (Cl. 99—8)

The invention relates to a process of preparing fruit for packing in containers, and more particularly to a process which is used for packing apples.

An object of the invention is to provide a process whereby the gases in the cells of the fruit may be quickly and efficiently removed and the cells substantially filled with water without any substantial cooking of the fruit.

A further object of the invention is to provide a process of the above character wherein the gases are withdrawn from the cells through the pull of a vacuum created by condensing steam in a closed chamber containing the fruit, so that the condensed steam and water introduced to cool the steam will be deposited on the surface of the fruit and forced into the cells of the fruit when the chamber is open to the atmosphere.

The process has to do with the treating of fruit for the purpose of removing air and gas from the cells thereof and replacing the same with water, preparatory to the packing of the fruit in a container where it is to be hermetically sealed, so that the fruit will carry with it little or no oxygen entrapped in the cells of the fruit. The process is particularly adapted for the treating of apples, and will be described in its use for this purpose. The apples are pared and quartered or sliced, and are then placed in a retort in bulk for treatment. The retort is provided with means for supplying steam thereto, and also a spray of cold water. There is likewise means for venting the retort. Suitable valves are provided for controlling the steam, the water and the venting. These may be of any desired construction, and the retorts, pipes and valves used in connection therewith are neither shown or described in detail. The apples after they have been pared and quartered or sliced, are placed in a retort. The vent is opened and steam is introduced very quickly into the retort until all of the air is driven out of the retort. The vent is then closed and the cold water spray turned on for condensing the steam and creating a high vacuum in the retort. The steam entering the retort quickly and retained therein only a time interval sufficient to exclude the air from the retort before it is cooled and condensed, does not cook the apples, except on the surface thereof. The steam contacting with the apples greatly facilitates the drawing of the gas and air from the cells of the apples when the steam is condensed through the admission of the cold water to the retort and the creating of a vacuum within the retort. This draws substantially all of the air and gas from the cells of the apples, causing the same to shrink. The water of condensation from the steam and some of the water introduced into the retort to cool and condense the steam will be deposited on the surface of the apples, until there is a water film covering the surface of the apples. The retort is then opened to the atmosphere and the atmospheric pressure will cause the water to pass into the cells of the apples, restoring the same partially to normal size and substantially filling all of the cells with water. Thus the air and gas normally in the cells of the fruit is drawn therefrom and replaced with water.

The apples when sealed in containers with air in the cells often have a more or less white, opaque appearance, and in some cases particularly near the core, a brownish appearance. When the apples are closed in containers with the air and gases in the cells, a corrosive action on the tin often occurs, producing perforations. When the apples are treated by the process described above, and the air and gases removed from the cells replaced with water, the fruit when removed from the containers in which it is marketed, has a more translucent appearance; and since the oxygen is removed from the cells, the product has less corrosive action on the tin container and resulting perforations. The apples treated as above are packed in containers and sealed therein in the usual manner.

While the invention described is particularly adapted for the treating of apples for packing and sealing in containers, it will be understood that it may be used in connection with fruits of any type where it is desirable to replace the air or gas in the cells of the fruit with water.

Having thus described the invention, what I claim as new and desire to secure by Letters Patent, is—

1. The process of conditioning fruit preparatory to packing and sealing the same in containers consisting in removing the skin from the fruit, slicing the fruit and placing the same in bulk in a retort, closing the retort and opening a vent therefor and quickly admitting steam to the retort while said retort is vented so that all of the air in the retort is expelled therefrom and replaced by steam, closing the vent and admitting a water spray into the retort whereby the steam is condensed and a vacuum produced within the retort which draws the air and gases from the cellular spaces in the fruit, and whereby water will be deposited on the surface of the fruit, and then opening the retort to the atmosphere for causing the water deposited on the surface of the fruit to enter and substantially fill the cellular spaces thereof.

2. The process of conditioning apples preparatory to packing and sealing the same in containers consisting in removing the skin from the apples, slicing the apples and placing the sliced sections in bulk in a retort, closing the retort and opening a vent therefor and quickly admitting steam to the retort while the retort is vented so that all of the air from the retort is expelled therefrom and replaced by steam, closing the vent and admitting a water spray into the retort whereby the steam is condensed and a vacuum produced in the retort which draws air and gasses from the cellular spaces in the apple sections and whereby a film of water will be deposited on the surface of the apple sections and then opening the retort to the atmosphere for causing the water deposited on the surface of the apple sections to enter and substantially fill the cellular spaces thereof.

ARTHUR E. STEVENSON.